2,898,270
TREATMENT OF GRAINS

Paul R. Witt, Jr., Chicago, Ill., and Richard G. Shaler, San Francisco, Calif., assignors of one-half to The Merto Company, San Francisco, Calif., and one-half to Northwestern Malt & Grain Co., Chicago, Ill., a corporation of Illinois No Drawing. Application June 26, 1958
Serial No. 744,664

13 Claims. (Cl. 195—70)

This invention relates to treatment of grains by the use of adsorbent materials such as clay, and has particular utility in the production of malt. In the production of malt, the invention relates to the addition of adsorbent material to barley prior to sulfuring thereof (where sulfuring is employed) and, in any event, the addition of the adsorbent material to the germinating grain prior to or during kilning. Preferred adsorbent materials suitable for use with the present invention may be clays, and particularly swelling, gelling clays of the montmorillonite family, such as bentonite, saponite, nontronite, sepiolite, beidelite and associated clay materials, and especially hectorite, a clay which occurs naturally in the vicinity of Hector, San Bernardino County, California, and which is generally defined as a magnesium lithium bentonite. However, other adsorbent clays, which do not swell and gel, such as fuller's earth, may be employed.

A conventional process for producing malt from barley is to steep or soak the barley in steep water for an extended period until the water penetrates the interior of the grain and germination commences. Thereafter, the grain is removed from the steep water and allowed to germinate. The germinating period generally lasts about six days. During the germinating period the growth of rootlets continues and considerable changes occur in the chemical structure of the grain. The present invention appears to affect these changes in a beneficial manner.

The beneficial effects of sulfuring are improved brewing or distilling when the malt is used in the production of beer or whiskey, stimulation of enzymatic activity, increase in the percentage of extract from a given quantity of malt, bleaching of the husks of the grain to improve color, and a considerable reduction in bacteria present in the malt. All of the foregoing advantages of sulfuring are obtained in accordance with the present invention without impairment.

In addition to the foregoing beneficial effects, sulfuring has certain deleterious effects, in that the solubilization of nitrogen is frequently difficult to control and that the titratable acidity of the malt is often increased to an undesirable extent. In accordance with the present invention, these deleterious effects of sulfuring are diminished.

Apart from the use of the invention to overcome the deleterious effects of sulfuring, the present invention has additional advantages, in that the clay appears to adsorb cationic groups and chemically modifies the malt to cause the beneficial effects. More soluble protein is produced than heretofore. The malt is improved in stability and flavor either with or without sulfuring.

An additional advantage of treatment in accordance with this invention is the fact that the clay picks up and removes odors and discolorations, with the result that the malt is cleaner in flavor and in visual appearance than untreated malt. The malt is brighter and better and more uniform in color.

A further advantage of treatment in accordance with this invention is the fact that the clay improves and facilitates handling of the malt when it is conveyed from place to place in the malting factory and during transportation and storage. In this connection the clay varies the "angle of repose" of the grain.

The germinating process is usually conducted by spreading the malt on the floor of a malting compartment or by transferring to a germinating drum and normally lasts about six days. During the germinating period, the grain in the compartment or drum is regularly stirred or turned so as to make it homogeneous. A turning machine which travels from end to end of the germinating compartment and turns the grain by helical screws is commonly used for such purpose. A conventional turning machine has as a regular part of its construction sprinkling heads which spray water on the grain to maintain germination. Hectorite may be sprayed on the germinating grain through the sprinkling heads in the following manner:

In one embodiment of the present invention, a slurry of 25 pounds hectorite in 40 gallons water is prepared and allowed to stand for a sufficient time to hydrate the clay. The slurry is then mixed with 1000 gallons water to form a suspension. The suspension is pumped through the spray heads of the turning machine for one complete pass in its travel from end to end of the malting compartment about 72 hours after the commencement of germination. The rate of spray is about 1 gallon of aqueous suspension per bushel of malt. As hereinafter appears, hectorite may be added at the rates of 0.1, 0.2, 0.3 and 0.5% by weight, but less than this range does not appear to produce the desired effects and higher than this range does not augment the desired effects. Thereafter the malt was sulfured in normal manner and then kilned. Rather than remaining as a surface coating, the clay appears to penetrate into the kernal and appears to be associated with an advantageous enzymatic activity of the malt.

The effect of treatment of malt in accordance with this invention is shown in the following Table I, wherein the effects on the development of stabilization of nitrogen solubilization, pH value and titratable acidity are as shown. Unsulfured control malt was tested, wherein no treatment with hectorite or other montmorillonite clay had been accomplished. Thus, in the first line of the table, the unsulfured control malt appears. This is followed by unsulfured malt treated with hectorite in concentrations of 0.1, 0.2, 0.3 and 0.5%. Following the unsulfured hectorite malt, there is a line for sulfured control malt, and this is followed by four lines for sulfured malt treated with four separate concentrations of hectorite. Table I shows the stabilization of nitrogen solubilization expressed in wort nitrogen (formol), pH and titratable acidity after kiln-sulfuring when hectorite is used.

TABLE I

*Effect on development of stabilization of nitrogen solubilization, pH value and titratable acidity as the result of the treatment of malt with hectorite*

| Malt | Solubilization Nitrogen, g./100 ml. | pH | Titratable Acidity [1] |
|---|---|---|---|
| Unsulfured Control Malt | 0.0285 | 5.83 | 5.90 |
| Unsulfured Hectorite Malt: | | | |
| 0.1% | 0.0280 | 5.87 | 6.20 |
| 0.2% | 0.0312 | 5.89 | 6.40 |
| 0.3% | 0.0333 | 5.87 | 6.20 |
| 0.5% | 0.0325 | 5.87 | 6.10 |
| Sulfured Control Malt | 0.0355 | 5.55 | 7.40 |
| Sulfured Hectorite Malt: | | | |
| 0.1% | 0.0305 | 5.62 | 6.20 |
| 0.2% | 0.0325 | 5.70 | 6.20 |
| 0.3% | 0.0330 | 5.75 | 7.20 |
| 0.5% | 0.0340 | 5.80 | 7.00 |

[1] Ml. n/10 NaOH to bring 100 ml. wort to pH 7.07.

The usefulness of the hectorite-treated malt is at least as great as the untreated malt. Thus, as shown in Table II, the extract percent, diastatic power, alpha-amylase content and protein content are substantially the same for both the treated and untreated malt, and no marked difference appeared. The control malt was not treated with hectorite, whereas the right hand column of the table shows hectorite-treated malt.

TABLE II

|  | Control | Hectorite-Treated |
|---|---|---|
| Extract, Percent | 75.1 | 75.0 |
| Diastatic Power ° L | 123 | 119 |
| Alpha-amylase | 41.5 | 42.0 |
| Protein: |  |  |
| Total Percent | 13.15 | 13.15 |
| Sol/Total | 42.7 | 43.0 |

Accordingly, it will be seen that treatment of the malt with a suspension of hectorite or other montmorillonite clay, such as bentonite, saponite, nontronite, sepiolite or beidelite, in concentrations of 0.1% to 0.5% sprinkled over the germinating grain prior to sulfuring and/or kilning, stabilizes nitrogen solubilization, pH value and titratable acidity. The treatment appears to chemically modify the malt by adsorption of cationic groups. Accordingly, the present invention has great utility in the treatment of malt, as above indicated.

One important use of malt is in the production of beer. Treatment in accordance with this invention improves the malt for such usage. Thus, laboratory worts were prepared from hectorite treated malts, boiled and cooled. A greater degree of clarity was obtained than worts from control (untreated) malts.

Laboratory worts from the hectorite treated malts and control malts were boiled under reflux and cooled in an open-type cooler. Even without a conventional diatomaceous earth treatment, the boiled worts from hectorite malts reflected a greater degree of clarity than did those of control malts exposed to diatomaceous earth treatment.

Table III illustrates the clarity of the worts from the malts, as effected by the diatomaceous earth treatment prior to filtration. The data is associated with malts which were kiln sulfured and reflects clarity in terms of nephelose units.

TABLE III

| Malt | Nephelose Units | |
|---|---|---|
|  | Without Filter Aid | With Filter Aid |
| Control | 51.5 | 39.0 |
| 0.2% Hectorite | 41.0 | 40.0 |
| 0.3% Hectorite | 39.0 | 35.0 |

Pilot brews employing corn grits reveal that hectorite treated malts were associated with rapid conversions and filtered readily during the lautering process. Excellent extraction of the grain bed during sparging was reflected in the low soluble extract values of the dried spent grains.

To obtain comparative data on sulfured and unsulfured malts, one portion was treated with 0.3% hectorite suspension without sulfuring and one portion of a different batch of grain was treated with 0.3% hectorite suspension and kiln sulfured prior to drying. Evaluation was conducted thus:

A malt and corn grits mash was prepared and filtered through a conventional laboratory lautering column and subjected to sparging in the conventional manner.

No significant difference was observed in the following noted areas:

(a) Conversion (very rapid)
(b) Filtration (normal to fast)
(c) Viscosity of unboiled wort
(d) Spent grains (soluble extract low, indicating good divorcement of mash extract)

American Society of Brewing Chemists laboratory wort (unboiled) was prepared from the mash. The sulfured and unsulfured batches showed the following comparison:

|  | Unsulfured | Sulfured |
|---|---|---|
| pH value | 5.92 | 5.83 |
| Titratable acidity [1] | 5.30 | 6.50 |
| Formal Nitrogen (g./100 ml. wort) | 0.0298 | 0.0313 |
| Extract, dry basis | 75.0 | 75.4 |
| Soluble Protein (percent) (malt, dry basis) | 5.35 | 5.53 |

[1] Ml. N/10 NaOH to bring acidity level of 100 ml. wort to pH 7.07. Both worts, when boiled, filtered brilliantly without the use of filter aid.

Cold water extracted fine grind malt was tested. (50 grams malt extracted for one hour with 400 ml. water at 3–4° C.) The following results were observed:

|  | Unsulfured | Sulfured |
|---|---|---|
| pH Value | 5.92 | 5.88 |
| Titratable Acidity [1] | 2.95 | 3.25 |
| Formal Nitrogen (g./100 ml.) | 0.0206 | 0.0212 |
| Soluble Protein (percent) (malt dry basis) | 3.98 | 3.95 |

[1] Ml. N/10 NaOH to bring acidity level of 100 ml. wort to pH 7.07. Both worts, when boiled, filtered brilliantly without the use of filter aid.

The foregoing data illustrates that for brewing purposes hectorite treatment of barley produces an improved malt even when the grain is not sulfured.

What is claimed is:

1. A method of treatment of grain during malting, comprising steeping the grain, germinating the grain, and kilning the germinated grain and which is characterized by the addition to the grain prior to kilning and subsequent to steeping of an aqueous suspension of a clay of the montmorillonite family.

2. A method of treatment of grain during malting, which comprises preparing a suspension of a clay of the montmorillonite family and adding said suspension to the germinating grain and subsequently drying the grain.

3. A method of treatment of grain during malting, which comprises preparing a suspension of a clay of the montmorillonite family and adding said suspension to the germinating grain, sulfuring the grain, and subsequently drying the grain.

4. A method of treatment of grain during malting, which comprises preparing a suspension of a clay of the montmorillonite family, adding said suspension to the germinating grain, treating the germinating grain with the clay suspension to stabilize nitrogen solubilization, reduce pH and increase titratable acidity of the malt, and drying the grain.

5. A method of treatment of barley during malting, comprising preparing an aqueous suspension of hectorite, adding the suspension to the germinating grain at the rate of between 0.1 and 0.5% by weight of barley, and subsequently kilning the barley.

6. The method of claim 5, in which said suspension is prepared by first forming a slurry of about 25 lbs. hectorite in 40 gal. water and mixing with about 1000 gal. water to form said suspension and in which said suspension is added to said barley at the rate of about 1 gal. per bushel of grain.

7. The method of claim 5, in which said barley is sulfured prior to completion of kilning.

8. A method of treating barley during malting, which comprises preparing a dilute aqueous suspension of a montmorillonite clay, germinating the barley, spraying the suspension on the barley in the proportion of about 0.1 to 0.5% by weight when the germination is about half completed, allowing the suspension to remain on the barley for the remainder of germination, and kilning the barley.

9. The method of claim 8, which further comprises sulfuring the barley after addition of suspension and before completion of kilning.

10. A method of treatment of grain during malting, comprising germinating the grain, spraying the grain during germination with an aqueous suspension of adsorbent clay, allowing the clay to act on the grain, and drying the grain.

11. A method of treatment of grain during malting which comprises contacting the germinating grain with clay of the montmorillonite family in the presence of moisture, and then subsequently drying the grain.

12. A method of treatment of barley during malting comprising contacting the germinating grain with hectorite in the presence of moisture, and subsequently kilning the barley.

13. A method according to claim 12 in which the barley is sulphured prior to completion of kilning.

References Cited in the file of this patent

UNITED STATES PATENTS

| | | |
|---|---|---|
| 2,291,624 | Heimann et al. | Aug. 4, 1942 |
| 2,433,411 | Wallerstein | Dec. 30, 1947 |

UNITED STATES PATENT OFFICE

CERTIFICATE OF CORRECTION

Patent No. 2,898,270                                                     August 4, 1959

Paul R. Witt, Jr., et al.

It is hereby certified that error appears in the above numbered patent requiring correction and that the said Letters Patent should read as corrected below.

In the grant, lines 3 and 14, and in the heading to the printed specification, lines 4 and 5, name of the first assignee, for "The Merto Company", each occurrence, read -- The Inerto Company --.

Signed and sealed this 26th day of January 1960.

(SEAL)
Attest:

KARL H. AXLINE
Attesting Officer

ROBERT C. WATSON
Commissioner of Patents